United States Patent [19]

Saxton

[11] 4,338,405
[45] Jul. 6, 1982

[54] PROCESS FOR CONTINUOUS CONTROLLED ALCOHOLYSIS OF POLYVINYL ACETATE

[75] Inventor: Ronald L. Saxton, West Grove, Pa.

[73] Assignee: E. I. Du Pont de Nemours and Company, Wilmington, Del.

[21] Appl. No.: 215,814

[22] Filed: Dec. 12, 1980

[51] Int. Cl.$^3$ ............................................. C08F 8/12
[52] U.S. Cl. ...................................... 525/62; 525/56; 525/60
[58] Field of Search ........................................... 525/62

[56] References Cited

U.S. PATENT DOCUMENTS

| | | | |
|---|---|---|---|
| 2,642,419 | 6/1953 | Waugh et al. | 260/91.3 |
| 2,643,994 | 6/1953 | Germain | 260/91.3 |
| 3,072,624 | 1/1963 | Akaboshi et al. | 260/91.3 |
| 3,300,460 | 1/1967 | Vacca | 260/89.1 |
| 3,386,981 | 6/1968 | Akaboshi et al. | 260/91.3 |
| 3,471,131 | 10/1969 | Fritzweiler et al. | 259/8 |

FOREIGN PATENT DOCUMENTS

| | | |
|---|---|---|
| 24-1259 | 2/1949 | Japan . |
| 29-20609 | 9/1954 | Japan . |
| 33-15773 | 6/1958 | Japan . |
| 39-38456 | 7/1964 | Japan . |
| 39-38457 | 7/1964 | Japan . |
| 40-19187 | 8/1965 | Japan . |

*Primary Examiner*—Stanford M. Levin

[57] ABSTRACT

Improved process for the preparation of partially alcoholyzed polyvinyl acetate having good compositional uniformity comprises rapid premixing of the polyvinyl acetate polymer and base catalyst solutions in a static mixer and carrying out the alcoholysis reaction in an intermeshing, self-wiping, twin-rotor mixer or mixing extruder. The process yields polyvinyl alcohol product having a maximum hot water insoluble fraction of about 1.1% by weight obtained by the proper adjustment of the feed temperature, the shear rate in the premixer and the catalyst concentration in the catalyst feed solution.

13 Claims, No Drawings

PROCESS FOR CONTINUOUS CONTROLLED ALCOHOLYSIS OF POLYVINYL ACETATE

BACKGROUND OF THE INVENTION

1. Field of the Invention

This invention relates to the alcoholysis of polyvinyl acetate and more particularly it relates to carrying out such process by a combination of rapid and uniform premixing of catalyst and polyvinyl acetate followed by alcoholysis in a reactor providing a narrow distribution of residence times.

2. Description of the Prior Art

Currently, most partially alcoholyzed polyvinyl alcohol (PAPVA) is manufactured by the "slab-casting" process. In this process a catalyst, e.g. sodium hydroxide, is mixed with the feed solution of polyvinyl acetate in methanol, and the viscous stream is formed into a layer on a moving belt. Reaction time is controlled by the belt speed. Because all the polymer molecules at any given cross-section along the belt have resided on the belt for substantially identical times, the casting belt provides a genuinely "plug-flow" reaction environment, which fosters a narrow distribution of degree of conversion to alcohol. Because the liquid layer is open to the atmosphere, the reaction temperature must be kept below the boiling point of the solvent mixture, which means at or below about 50° C. This results in a relatively low reaction rate. The low rate, coupled with mechanical limitations on belt size, leads to a restricted capacity per line. Reportedly the capacity of a commercial slab casting line is on the order of $15-20 \times 10^6$ lb/year.

Reportedly, the polymer solids content of the feed to belt-casting alcoholysis lines is restricted to about 35%. Such a low solids level results in a heavier burden on the facilities in which the unreacted methyl alcohol and the by-product methyl acetate are recovered. This restriction on feed solution concentration obtains because of the necessity to avoid overheating, and hence initiation of local reaction during the mixing process. The high rotational speeds, and high shear rates characteristic of catalyst premixing devices of the prior art, coupled with the low reaction temperature characteristic of the slab-casting process, combine to impose a limit on the viscosity of the polyvinyl acetate feed solution that can be processed. Likewise, those premixers of the prior art that function by spinning the feed solution into thin films, or into droplets in order to obtain rapid, intimate contact with catalyst solution also require polyvinyl acetate solutions of relatively low viscosity.

A further consequence of this restriction on feed solution viscosity is that polymers of higher molecular weight must be run at lower feed solution concentrations. This imposes an economic penalty on manufacture of higher molecular weight polyvinyl alcohols.

U.S. Pat. No. 2,642,419 teaches thoroughly mixing polyvinyl acetate solution with an alcoholic solution of sodium hydroxide, partial reacting of the mixture on a moving surface, e.g. a conveyor belt, comminuting the resultant gel, and allowing the comminuted gel to further react. Polyvinyl acetate solution concentrations of 24–30% are cited. Mixing is carried out in a stirred vessel.

U.S. Pat. No. 2,643,994 teaches a continuous process for alkaline alcoholysis of polyvinyl esters. In the process the polymer solution is rapidly and intimately mixed with catalyst solution in a mixing zone (not described), then the mixture is conveyed though a reaction zone of uniform temperature without further mixing, e.g. on a moving belt, and finally the product is comminuted and the catalyst neutralized with a dilute acid solution in an inert solvent. Polymer solutions with viscosities of 1 to 80 poise (100–8000 m.Pa.s) at the reaction temperature are preferred. Reaction times of 32 to 200 min were used to attain conversions ranging from 100 to 56 mole %. No discussion of product properties other than conversion was offered, and the mixing device employed was not disclosed. Mixing times in the mixing device were about 2 minutes. Polymer solution concentrations ranged from 55% to 20%, depending on polymer molecular weight. The reaction temperature was 20° C.

Japanese Patent Application No. 38456/64 (Publication No. 21848/68) discloses saponification reaction carried out in an intermeshing, self-wiping, twin-shaft saponifier device. The mixing and kneading action is provided by eccentrically mounted discs. The polyvinyl acetate feed had a concentration of 10–25% in methanol.

Japanese Patent Application No. 20609/54 (Publication No. 9370/56) discloses mixing the catalyst and the polyvinyl acetate and then feeding and reacting the resultant mixture in a continuous twin-screw saponifier.

Japanese Patent Application No. 15773/58 (Publication No. 13141/60) discloses a continuous saponification vessel having two parallel agitator shafts fitted with stirring blades. The agitators were not self-wiping. Baffle plates were used to reduce by-passing of unreacted polymer. Conversions of 90 to 99 mol % were stated to be attainable.

Japanese Patent Application No. 38457/64 (Publication No. 22,448/67) discloses an intermeshing, self-wiping, twin-screw device used as a continuous saponifier. The purpose of the invention is to prevent adhesion of material to the reactor parts during alcoholysis of polyvinyl acetate. No discussion of operating conditions, or product properties, is presented.

Japanese Patent Application No. 1259/49 (Publication No. 4045/51) claims a continuous apparatus for manufacture of polyvinyl alcohol in which alcoholic solutions of polyvinyl acetate (10–20%) and alkali (13%) are mixed in a high speed mixer (1500–7000 rpm) (not otherwise described) then fed to a screw conveyor type saponifier in which the reaction time is about 5 min. There is no disclosure pertaining to control of conversion.

Japanese Patent Publication No. 19187/65 discloses, as a means for continuous hydrolysis of polyvinyl acetate, a reaction vessel having at least two parallel shafts fitted with lens shaped rotor elements, the rotors having a self-wiping contour. In the example the feed solution contained 40% polyvinyl acetate, the reaction temperature was 35° C., the residence time 40 min. and the conversion was 98 mol %.

U.S. Pat. No. 3,386,981 discloses a method of rapid mixing of viscous and nonviscous liquids, specifically as applied to the production of polyvinyl alcohol. The viscous fluid is formed into a cylindrical, flowing film, and the nonviscous fluid applied as a fine spray to the inner surface of said film. The saponifying mixture is dispersed into droplets by a spinning disc, and the reaction completed in a slurry. Feed solutions of 20% polyvinyl alcohol, reaction temperatures of 50°–90° C., and reaction times of 2 minutes are set forth in the specification. Control of conversion is not mentioned. More complete saponification is stated to result from practice of the invention.

U.S. Pat. No. 3,471,131 discloses a concentric cylinder, rotating device for rapid mixing. Mixing of a 40% polyvinyl acetate-methanol solution with a 2.5% solution of sodium methylate is illustrated in one example. The properties of the product are not described.

U.S. Pat. No. 3,300,460 discloses the combination of mixing polyvinyl acetate and catalyst under very high shear conditions for a very brief period of time, followed by saponification yielding finely divided granular polyvinyl alcohol having high mechanical strength and solubility in hot water. Polyvinyl acetate solutions of 5–30% are disclosed, and temperature rises of 8°–22° C. are cited as typical. The mixing device is described in U.S. Pat. No. 2,687,877.

U.S. Pat. No. 3,072,624 teaches a continuous saponification process, with one object of the invention being to achieve high conversion to polyvinyl alcohol. Polyvinyl acetate and catalyst solutions are mixed in a device of high rotational speed, which generates and then combines thin layers of both components. Polymer solutions of 15% to 30% concentration are preferred. Reaction temperatures are 25° to 60° C. Mixing times of 0.1 min. are cited in the examples. The saponifier which follows the mixer, is in one embodiment, an intermeshing, twin-screw conveyor. The effluent from the saponifier is stated to be a solid mass which is crushed and subdivided, then filtered and dried. Conversions of 99.2–99.5% are cited, at reaction times of 3 to 21 minutes. The patent discloses that in order to obtain a polyvinyl alcohol of uniform quality in a continuous process, it is necessary to use a continuous mixing device which effects a sufficiently uniform mixing in a very short time, and then to transfer the mixture immediately to a saponifying device which can effectively handle the very viscous material as mixing and saponification are continued. There is no teaching of how to control conversion, nor of how to operate the process so as to obtain a narrow distribution of composition.

SUMMARY OF THE INVENTION

According to the present invention, there is provided in a continuous process for the partial alcoholysis of a polyvinyl acetate homopolymer or copolymer, which process comprises (1) rapidly premixing a methanol solution of polyvinyl acetate homopolymer or copolymer with a methanol solution of a basic catalyst in a mixing zone to form a uniform mixture of said solutions, (2) passing said mixture from the mixing zone into a reaction zone, (3) passing said mixture through said reaction zone while maintaining the temperature and residence time in said reaction zone such that the desired degree of alcoholysis is obtained, (4) continuously removing the resultant products of reaction from the reaction zone, and (5) rapidly and uniformly neutralizing the basic catalyst in the resultant solid product by treating said product with an acidified liquid which is an inert non-solvent for the solid product, the improvement which comprises producing a partially alcoholyzed polyvinyl alcohol having a maximum hot water insoluble fraction of about 1.1% by weight by premixing catalyst and polymer solutions in a static mixer, by using an intermeshing, self-wiping, twin-rotor mixer or mixing extruder to provide the reaction zone, and by adjusting the feed temperature, the shear rate in the premixer, and the catalyst concentration in the catalyst feed solution such that the ratio $$\frac{kC_i(10^2)}{\dot{\gamma}_p}$$

is from about 0.5 to about 1.4,
where
k is the alcoholysis reaction rate constant in sec$^{-1}$
$C_i$ is the catalyst feed solution concentration in weight percent
$\dot{\gamma}_p$ is the shear rate in the premixer in sec$^{-1}$.

DETAILED DESCRIPTION OF THE INVENTION

A new process was discovered for the preparation of partially alcoholyzed polyvinyl alcohol (PAPVA) of uniform composition by controlled partial conversion of polyvinyl acetate to polyvinyl alcohol. Continuous operation was achieved by using an intermeshing, self-wiping, twin-screw, mixing extruder as the reactor. Use of this type of mixing device, which is in common use in the plastics industry, prevents plugging due to adhesion of the reaction mixture to screw and barrel surfaces. A second necessary feature is the relatively narrow distribution of residence times attainable in devices of this general type, because residence time directly affects the extent of reaction obtained in any given element of the reaction mixture.

The chemistry employed was base-catalyzed alcoholysis. The catalyst was sodium methylate in methanol solution. High productivity per unit reactor volume was achieved by using elevated temperatures.

Degree of conversion is determined by three major variables: temperature, reaction time (or residence time in the reactor), and catalyst concentration. In practice, it is convenient to fix the time and temperature, and adjust catalyst concentration to achieve the desired conversion of acetate to alcohol. Operation of the process is not affected by polymer molecular weight, or by the concentration of polyvinyl acetate in the reactor feed stream.

The reaction is stopped by rapid mixing, or slurrying, of the wet, crumbly "extrudate" with a stream of solvent containing acetic acid. The acid destroys the alkaline catalyst, effectively halting any further reaction. This mixing step can be carried out in a small stirred tank.

The critical features of the process of the present invention are:

(1) Very rapid and uniform mixing of the catalyst solution with the polyvinyl acetate-methanol solution. It is important that relatively little reaction occur during this step.

(2) Carrying out the reaction for a carefully controlled length of time, in a reactor that provides a narrow distribution of residence time. Steps (1) and (2) are necessary to ensure a narrow distribution of composition (vinyl acetate-vinyl alcohol ratio) within the product. Molecules that contain too much vinyl alcohol will not dissolve in cold water (about 25° C.) while too little alcohol content results in hot water (about 80° C.) insoluble portions. Complete solubility over a broad temperature range is an important performance feature of PAPVA, especially when it is used as a protective colloid, or stabilizer for polymer emulsions.

(3) Rapid and uniform quenching of the reaction throughout the reaction mass as soon as the material has reached the desired degree of conversion. Failure to do this will lead to overreacted cold water insoluble portions.

The process of the present invention is preferably carried out:

(1) by the use of "static", or "motionless" mixers to premix catalyst and polymer solutions, coupled with (2) reaction in an intermeshing, self-wiping, twin-rotor mixer, or mixing extruder to give a partially alcoholyzed polyvinyl alcohol with controlled composition and good uniformity of composition.

In the process of this invention the reaction is conducted in a mixer, or a mixing-extruder, in which elevated pressures and temperatures can be employed. This results in improved line productivity compared to current, slab-casting technology.

Polyvinyl alcohol of commercial interest has a 4 percent solution viscosity in water at 20° C. (determined by the Hoeppler falling ball method) of from about 5 to about 40 mPa.s. The process of the present invention can produce materials in this range.

Catalysts used in the present invention are basic catalysts, e.g. alkali metal methylates or hydroxides especially sodium methylate or sodium hydroxide. Other catalysts, such as lithium or potassium methylate or hydroxide can also be used.

The polyvinyl acetate homopolymer or copolymer solids are fed to the reactor in a methanolic solution having a solids concentration of from about 35 percent to about 55 percent. A concentration of about 48 percent is preferred. Corresponding viscosities of the polyvinyl acetate feed solutions of from about 35 percent to about 55 percent solids concentration for a polymer yielding a PAPVA with a 4% solution viscosity of about 22 m.Pa.s (equivalent to about 30 m.Pa.s for the fully hydrolyzed polyvinyl alcohol FHPVA derived therefrom) would be from about 50 Pa.s to about 2700 Pa.s at 50° C. and from about 70 Pa.s to about 3500 Pa.s at 40° C. The process of the present invention is suitable for feed solutions having viscosities in this range. However, solutions having lower viscosity can also be employed therein.

Polyvinyl acetate homopolymer is the most commonly used starting material. Partial alcoholysis of this homopolymer yields a copolymer of vinyl acetate and vinyl alcohol. Other starting materials, i.e. polyvinyl acetate copolymers with the following comonomers can also be of interest:

| Comonomer | Approximate Maximum Weight % In the Copolymer |
|---|---|
| Methyl Methacrylate | 8 |
| Methyl Acrylate | 20 |
| Acrylic and Methacrylic Acids | 10 |
| Mono- and Diesters of Maleic Acid (methyl, ethyl, butyl) | 5 |
| Dimethyl Amino Ethyl Vinyl Ether | 20 |
| α-olefins having from 2 to 18 carbon atoms, e.q. 1-decene | 5 |
| Octadecene | 1 |

Goal conversion to vinyl alcohol is about 88 mol percent. This composition has proved to have the broadest utility in practical end use applications. Conversions over 90 mol percent can also be easily achieved. However, below 80 mol percent the raw product from the extruder becomes sticky, and is difficult to disperse in solvent for rapid neutralization of catalyst. Conversion is typically expressed in terms of saponification number (SAP NO.). Expressed in this way, a range of SAP NO. of from about 37 (97 mol percent conversion) to about 196 (about 82 mol percent) can be readily obtained in the process of this invention, and this range of composition is taken to comprise partially alcoholyzed PVA for the purposes of this invention.

The alkaline catalyst, for example sodium methylate, is injected into the polyvinyl acetate feed stream as a solution in methanol. The concentration of this solution can be varied from about 4 to about 25 percent by weight, preferably from about 5 to about 15 percent by weight. A level of from about 5 to about 10 percent by weight is most preferred because it gives a lower rate of buildup of "skin" in the premixer than observed with concentrations above 10%, while permitting production of a product having good uniformity.

Water reacts with sodium methylate to yield sodium hydroxide which is a less effective catalyst. For reasons of economy, and to minimize the potential ash content of the product, when the catalyst is an alkali metal methylate the water content of the feed should be kept as low as possible. Preferably the water content should not be more than 1000 ppm, and most preferably it should not be more than 500 ppm.

Inlet temperature to the premixer can be from about 30° to about 65° C., preferably from about 40° to about 60° C. Temperature range of from about 40° to about 45° C. is most preferred in order to maintain a slower reaction rate during the mixing step without excessive pressure drop across the premixer.

Temperatures in the mixing extruder (reactor) can be from about 45° to about 75° C., preferably from about 50° to about 70° C. A temperature range of from about 55° to about 65° C. is most preferred. Below 45° C. the reaction rate is so low that economically unattractive catalyst concentrations, or reactor sizes, must be used.

Generally the residence time in the static premixer is from about 0.04 to about 0.6 minutes preferably from about 0.067 to about 0.43 minutes. Most preferred residence time is from about 0.1 to about 0.3 minutes. In torpedo type mixers the residence time employed was about 0.8 to about 0.9 minutes.

Generally the residence time in the twin-rotor reactor is from about 0.5 to about 4 minutes, preferably 0.86 to about 3 minutes. Most preferred residence time is from about 1.0 to about 1.5 minutes.

Preferred premixer devices for admixing catalyst solution with the polyvinyl acetate feed solution are of the type called "static mixers" or "motionless mixers". These provide relatively rapid mixing with low energy input (hence, small temperature rise), and so reduce the chance for local overreaction to occur during the mixing process.

Of the static mixer family the preferred design is the "Ross" ISG (acronym for "interfacial surface generator", marketed by Charles Ross & Son Co., Hauppauge, NY) (described in U.S. Pat. No. 3,483,678). This type has a small free volume, which minimizes time available for premature reaction. The mixing accomplished per unit free volume is relatively high for this design. "Koch" SMV mixers, as described in U.S. Pat. No. 3,785,620, were used as first-stage premixers to distribute the catalyst stream radially in the polymer stream.

The "Koch" SMV geometry is efficient for subdivision and distribution of a low-volume, low-viscosity additive in a larger, high-viscosity fluid stream.

The preferred design consists of 1-5 "Koch" mixing elements, followed by 14-20 "Ross" ISG elements. The ISG elements are twice the diameter of the "Koch" elements. This gives approximately equal free volumes per unit pipe length.

The "degree of mixing" effected by the ISG premixer can be characterized by the "number of layers" generated by the successive subdivisions and recombinations undergone by the fluid as it passes through the mixing elements:

$$L = N(4)^E$$

where
L = number of layers
N = number of initial input streams (taken as 2 for estimating purposes)
E = number of ISG elements In the present work, ISG arrays of 14-20 elements gave generally satisfactory product; these correspond to calculated layer formations of $5.4 \times 10^8$ and $2.2 \times 10^{12}$, respectively.

The "mixing torpedo" device, as described in U.S. Pat. No. 3,006,029, could also be used for premixing, as could the intermeshing, twin-screw, mixer-extruders made by Werner and Pfleiderer Corp., and by Baker-Perkins. However, such motor-driven machines would be more expensive, and would produce a greater temperature rise.

Intermeshing, corotating, self-wiping, twin-screw mixers, and extruders that comprise the reactors in the present invention are used for plastics compounding, extrusion, and devolatilizing. Lighter duty machines of this type are used for continuous mixing of pastes and doughs by foodstuff, and chemical producers.

Machines of this general type are made by Werner & Pfleiderer of Stuttgart, W. Germany, and by Baker-Perkins, and Readco-Teledyne in the U.S. A high length to diameter (L:D) ratio is preferred for PAPVA production, because this geometry results in a more "tubular" reactor, with a narrower distribution of residence times.

In the examples of the present invention machines were employed having L:D ratios of 28-39. Screws of either 2-lobe or 3-lobe design were used. The screws (or agitators) consisted of 27-72% (by length) of the so-called "kneading blocks," which provide better mixing than conveying screw segments. A screw, or rotor having more than 50% of its length in kneading blocks is the preferred design. A screw having only 13% of the length as kneading sections did not comminute the solid polyvinyl alcohol crumb adequately to permit the extrudate to be rapidly dispersed in the acidified solvent.

There are two geometries of screws available in "self-wiping profile": the three-lobe, and the two-lobe designs. Of these the two-lobe type is preferred, because it affords the higher free volume of the two, and so tends to reduce the machine size (diameter) needed for a given production rate. However, either type is technically well-suited for the alcoholysis reaction.

Typical screw arrangements are shown in Tables A and B.

Because the extruder-reactor screws have some conveying ability, the extruder can in principle, be run with greater or lesser "degrees of filling", depending on the rpm setting at a given feed rate. Information published by Werner and Pfleiderer (Polymer Processing News II #2, Spring 1980) shows that reducing the degree of filling causes a broadening of the distribution of residence times. This would, of course, be detrimental to product uniformity. There is some experimental evidence for this effect. Also, running only partially full would not utilize all the available volume, and so would act to raise catalyst demand. The screws should be run substantially full to avoid these effects.

TABLE A

| Screw Arrangement for ZSK-53[1] | | | |
|---|---|---|---|
| Barrel 1 | 2 | 3 | 4 |
| 45/45 | 2 × 30 KB . 60° | 2 × 90 KB . 60° | 45/180 |
| 45/180 | 2 × 90 KB . 60° | 2 × 30 KB . R | 90/258 Notched |
| 3 × 30 KB . R | 45/180 | 45/180 | |
| 30 KB . L | | | |
| 30 KB . R | | | |
| 90 KB . 60° | | | |

[1]The ZSK-53 had 53 mm diameter, 3-lobe type screw elements. A designation such as 45/180 refers to an element of 45 mm lead/180 mm length. Elements carrying the designation "KB" are kneading or mixing elements. The letters L and R refer to left, or right-handed pitch. The "60°" denotes a neutral pitch. The initial numeral is the length of the individual element in mm.

TABLE B

| SCREW ARRANGEMENT FOR ZSK-90[1] | | |
|---|---|---|
| Barrel 1: (Feed Zone) | 60/60 60/30 60/120 | Barrel Length = 2.88 m |
| Barrel 2: | 3 × K-90 30° × 4 discs | L/D = 32 Volume = 10.76 l |
| Barrel 3: | K-90, 30° × 4 60/60 LH K-90, 30° × 4 | |
| Barrel 4: | 3 × K-90 30° × 4 | |
| Barrel 5: | 3 × K-90 30° × 4, LH | |
| Barrel 6: | K-90, 30° × 4, LH 60/120 60/30 LH | |
| Barrel 7: | 60/30 LH 3 × K-80 45° × 5 | |
| Barrel 8: | 3 × K-80 45° × 5 | |
| Barrel 9: | 60/120 2 × 60/30 LH | |
| Barrel 10: | 2 × K-120 90° × 9 | |
| Barrel 11: | 80/160 2 × K-60 30° × 4 LH | |
| Barrel 12: | 2 × K-60, 30° × 4, LH 60/30 LH 80/20 LH K-80 30° × 5 K-60 30° × 4 | |

8-0: Transition or discharge piece
[1]The ZSK-90 had 90 mm diameter, 2-lobe type screw elements. Conveying elements are denoted by two numerals: lead/length, and by "LH" if left-hand pitch. Kneading elements are labelled "K"-length in mm-pitch X number of individual discs in the element, e.g. K-80, 45° × 5. "LH" again marks a left hand pitch.

The partially alcoholyzed polyvinyl alcohol product obtained by the process of the present invention has good uniformity of composition, i.e., low hot water insoluble (HWI) and cold water insoluble (CWI) fractions. For convenience the HWI fraction is being used as the principal measure of heterogeneity. In our experience, the HWI fraction is more sensitive to process conditions than the CWI fraction. Also, if the HWI fraction is satisfactory, the CWI fraction of the same product has generally been found to be satisfactory too. The HWI fraction of the product obtained by the process of the present invention should not exceed 1.1 percent by weight, preferably should not exceed 0.6 percent by weight.

Obtaining such homogeneous, compositionally uniform products requires maintaining a certain ratio between two rate processes during the premixing step:

$$\frac{\text{rate of reaction along the interface between polymer solution and catalyst solution}}{\text{rate of mixing of the two solutions}}$$

This ratio can be formulated as:

$$\frac{kC_i}{\dot{\gamma}_p} = \frac{\begin{bmatrix}\text{alcoholysis reaction} \\ \text{rate constant} \\ (\sec^{-1})\end{bmatrix} \times \begin{bmatrix}\text{Catalyst solution} \\ \text{concentration} \\ (\text{wt \%})\end{bmatrix}}{[\text{shear rate in the premixer, }(\sec^{-1})]}$$

In turn, the shear rate can be calculated from the flow rate, and the diameter of the four holes in each "Ross" ISG mixing element:

$$\dot{\gamma}_p = \frac{4(Q/4)}{\pi R^3}$$

where Q=total liquid flow through static mixer, cm³/sec.
R=hole diameter, cm.

Thus the feed temperature, the shear rate in the premixer, and the catalyst concentration of the feed solution should be adjusted such that the ratio $$\frac{kC_i(10^2)}{\dot{\gamma}_p}$$

is from about 0.5 to about 1.4. In principle, from the standpoint of product uniformity, there should be no preferred lower limit on $$\frac{kC_i(10^2)}{\dot{\gamma}_p}.$$

However, there do exist practical constraints on achieving very low values: (1) reducing feed temperature will increase feed solution viscosity, and therefore will increase pressure drop across the premixer. Also reaction rate will be lowered, which will mean either increased catalyst consumption or reduced production rate; (2) to increase shear rate in the premixer requires overcoming increased pressure drop. This requires heavier duty, more costly pumps; (3) decreasing the catalyst concentration in the feed solution means that a greater excess of unreacted methanol will be present in the reactor effluent. This will add to the cost of recovering this ingredient. Also experimentally we have found that dilution of the catalyst feed below 10% concentration does not result in detectable reduction in HWI. Based upon these factors the preferred range for the ratio $$\frac{kC_i(10^2)}{\dot{\gamma}_p}$$

is from about 0.9 to about 1.1.

The following examples are given for the purpose of illustrating the present invention. All parts and percentages are by weight unless otherwise specified.

EXAMPLE 1

Polyvinyl acetate was obtained as a 45.4% solution in methanol. This solution also contained 0.096% of water. The molecular weight was such that the fully alcoholyzed polymer would yield a 4% solution viscosity of 13 m.Pa.s. This polymer solution was fed from pressurized steel drums to a gear pump, which metered it to subsequent process steps. From the gear pump the solution passed through the following equipment, in order:

(1) a heat exchanger, wherein the solution was heated to 45° C. with hot water at about 69° C.

(2) a 1.5 inch diameter "Kenics" static mixer with eight mixing elements and a free volume of 400 ml. This mixer served to thermally homogenize the solution prior to contact with catalyst solution.

(3) a premixer consisting of the following sequential arrangement of static mixing elements:
 (a) one (1) 1.5 inch, "Koch" SMV Type CY element, and (b) eighteen (18) 2 inch "Ross" ISG elements.

(4) a three-way plug-type diverter valve.

(5) a 53 mm diameter ZSK-53 "Werner and Pfleiderer" mixer-extruder (extruder-reactor), with a screw length of 2133 mm and a free volume of approximately 2000 ml. This was operated at 130 rpm.

The polymer solution was fed at a rate of 1418. g/min. A 10% solution of sodium methylate was injected near the centerline of the premixer inlet at a rate of 97 ml/min to give a catalyst concentration of 0.57% relative to polymer solution. Extruder barrel section temperatures (zones 1-4) were maintained at 54°, 58°, 56°, and 55° C. by circulating hot water. Zone 5 was cooled to 28° C. by tap water to avoid excessive flashing of solvent from the extruding product.

The reacted product was a wet, crumbly mass. It issued from the machine through a conventional 8-0 transition piece followed by a short length of 1.5 inch diameter pipe, and fell into an 8 l agitated tank, where it was suspended by vigorous agitation in a stream of acidified solvent (1.6 l of acetic acid/190 l of solvent; the solvent composition was: about 78% methyl acetate, 20% methanol, 2% water). This "quench" solution was fed at about 2 l/min.

The resulting slurry was filtered; the filter cake was washed with methanol, and dried in a vacuum oven at 65° C. under a nitrogen purge. The dried product was a white, friable granulate. The Sap. No. was 112; the hot water insoluble fraction (HWI) was 0.04%, and the cold water insoluble portion (CWI) was 0.28%.

Procedure for determination of HWI is as follows:
1. Dissolve 5.00 g of sample (C, exact mass) in 400 ml of water on magnetically stirred hot plate equipped with pyrex water bath.
2. Add 1-2 drops of antifoam, "Tergitol" 15-S-3. This is necessary because undissolved particles become trapped in any foam, and do not make adequate contact with the hot water.
3. Heat solution to 80° C., hold at 80° C. for 30 min. (temperature by mercury thermometer). Insoluble material will precipitate as a scummy mass, which tends to collect on the thermometer.
4. Filter using "Gelman" 47 mm magnetic vacuum filter funnel (or equivalent) with Gelman Acropor membrane filter AN-800 (0.8 μm pores) tared to ±0.001 g (A).
5. All solids from thermometer, jar, or sides of filter funnel must be recovered (using rubber policeman and rinse water) and placed on filter membrane.
6. Remove membrane plus solids from the filter funnel. Dry filter membrane+solids under heat lamp until all water is removed.
7. Weigh dry filter+solids to ±0.001 g (B).
8. Calculate % HWI $$\% HWI = \frac{(B - A) \, 100}{C}$$

Procedure for determination of CWI is as follows:
Grind samples in an impact mill, e.g. an Alpine pin mill, to a fine flour-like powder.
Filter used: "Gelman" 47 mm pressure filter, or equivalent.
Filter Membrane: "Versapor" AA 1.0 μm
1. Dissolve 5.000 g (G) of sample in about 700 ml of water, stirring overnight at room temperature (25° C.). Sprinkle powder into agitated water to avoid lump formation.
2. Determine net weight of the water solution (S) and weigh out a 20.00 to 50.00 g aliquot portion (P).
3. Filter the 20.00 to 50.00 g portion using a tared filter membrane (to 0.1 mg) ($M_O$).
4. Dry the membrane under heat lamp, or in a vacuum oven.
5. Weigh membrane ($M_1$) to get weight of insoluble phase.

$$CWI = \frac{(M_1 - M_0) \, (S) \, (100)}{(P) \, (G)} \qquad 6.$$

EXAMPLE 2

Polyvinyl acetate was obtained as a 46.1% solution in methanol. This solution also contained 0.101% water. The estimated 4% solution viscosity was again 13 mPa.s. Equipment and procedure were generally the same as described in Example 1.

The polymer solution was heated to 57° C. and fed to the extruder-reactor at a rate of 1415 g/min. A 10% methanolic solution of sodium methylate was injected at the premixer inlet at a rate of 113 cc/min to give a concentration of 0.666% based on polymer solution. Extruder barrel section temperatures were 58°, 57°, 61°, 60°, and 31° C. Residence times were 0.25 and 1.19 minutes in premixer, and extruder reactor, respectively. After being worked up, the product had a Sap. No. of 116, and a hot water insoluble fraction of 0.76%. Thus, while the degree of conversion to polyvinyl alcohol was nearly the same as in Example 1, the heterogeneity, as evidenced by the larger under-reacted HWI portion, had become worse. The major change was the higher feed temperature.

COMPARATIVE EXAMPLE 1

Polyvinyl acetate was obtained as an approximately 44% solution in methanol. The molecular weight was such that the fully alcoholyzed polymer would yield a 4% solution viscosity of about 30 mPa.s. The polymer solution was charged into a tank, which was then pressurized with nitrogen. From this tank the solution flowed to a gear pump, which metered it to subsequent process steps, including the following equipment in order:

(1) A 1.5 inch diameter "Kenics" static mixer with eight mixing elements, and a free volume of 400 ml.
(2) A 4 inch diameter "Ross" ISG static mixer with 14 mixing elements, and a free volume of 2400 ml.
(3) A 90 mm diameter ZSK-90 "Werner and Pfleiderer" mixer-extruder, with a screw length of 3020 mm, and a free volume of approximately 10,756 ml. The screw was operated at 150 rpm. The feed entered the reactor at ambient temperature.

Items (1) and (2) constituted the premixer. Catalyst solution (17.5% sodium methylate in methanol) was injected at the inlet of (1) at a rate of 280 ml/min. The polymer solution was fed at a rate of 5750 g/min so that the concentration of catalyst relative to polymer solution was 0.76%. Residence times were 0.42 min in the combined premixers, and 1.6 min in the extruder-reactor.

Ten of the twelve ZSK-90 barrel sections were heated with hot water in sets of two to temperatures of (in order) 58°, 58°, 64°, 62°, and 51° C. The last two barrels were cooled with tap water to 32° C.

The reacted product issued from the machine through an 8-0 transition piece, and a short length of 2 inch pipe. The temperature of the wet, crumbly mass was 45° C. It fell into an agitated 15 gallon tank, and was suspended in a stream of 5100 ml/min of acidified (2.4 liter acetic acid/191.4 liter solvent) solvent (78% methyl acetate, 20% methanol, 2% water).

After workup, the product had a Sap. No. of 114. The cold water insoluble fraction was 2.53%, and the hot water insoluble portion was 2.34%.

Thus in the above three experiments the degrees of conversion were similar, whereas uniformity of composition, as evidenced by the "low conversion tail", measured as HWI, differed significantly. Attempts to understand the cause of this variation, in this, and in other sets of data at constant Sap. No., pointed to the necessity of maintaining a certain ratio between two rate processes occurring in the premixer:

$$\frac{\text{rate of reaction along the interface between polymer solution and catalyst solution}}{\text{rate of mixing of the two solutions}}$$

This ratio can be formulated as:

$$\frac{kC_i}{\gamma_p} = \frac{\left[\begin{array}{c}\text{alcoholysis reaction}\\ \text{rate constant}\\ (\text{sec})^{-1}\end{array}\right] \times \left[\begin{array}{c}\text{catalyst solution}\\ \text{concentration}\\ (\text{wt. \%})\end{array}\right]}{[\text{shear rate in the premixer, } (\text{sec}^{-1})]}$$

In turn, a representative shear rate can be calculated from the flow rate, and the diameter of the four holes in each "Ross" ISG mixing element:

$$\dot{\gamma}_p = \frac{4(Q/4)}{\pi R^3}$$

where
Q = total liquid flow through static mixer, ml/sec.
R = hole diameter, cm

This work defined a critical limit for the value of this ratio, above which limit the product became unacceptably heterogeneous in composition. This heterogeneity was manifest in increasing levels of hot and cold water insolubles. For convenience the hot water insoluble fraction (HWI) has been used as the principal measure of heterogeneity.

EXAMPLES 3 TO 12 AND COMPARATIVE EXAMPLES 2 TO 8

In Table I are collected the data for a number of sets of experiments. Within each set the polymer compositions (percent vinyl alcohol) were approximately equal, so that differences in HWI can be ascribed to causes other than the vinyl alcohol-vinyl acetate ratio.

A level of HWI of about 1.1% for a product within the desirable range of composition, i.e. Sap. No. 125–145 (approximately 89–87 mol % vinyl alcohol), can be considered the upper limit for acceptable performance as an emulsion stabilizer. To achieve this when using a "static-premixer" the feed temperature, the shear rate in the premixer, and the catalyst feed solution concentration must be mutually adjusted so that the ratio $kC_i(10^2)/\dot{Y}_p$ does not exceed 1.4.

To maintain the required low value of $kC_i(10^2)/\dot{Y}_p$ means that, in general:

(1) $C_i$ be $\leq 10\%$. However, products of experiments in which $C_i$ was set at 5% did not show significantly reduced HWI compared to products made with $C_i$ set at 10%.
(2) Feed temperature be $\leq 48°$ C., and
(3) Shear rate in the premixer be $\geq 100$ sec$^{-1}$.

TABLE 1

| Set | Example | Sap. No. | $C_i$ % | k Sec.$^{-1}$ | $\dot{\gamma}_p$ Sec.$^{-1}$ | $\dfrac{kC_i \cdot 10^2}{\dot{\gamma}_p}$ | HWI % |
|---|---|---|---|---|---|---|---|
| A | 1 | 112 | 10 | 0.105 | 101.0 | 1.040 | 0.04 |
|   | 1a | 117 | 10 | .106 | 98.8 | 1.073 | 0.14 |
|   | 2 | 116 | 10 | 0.136 | 101.8 | 1.336 | 0.76 |
|   | C-1 | 114 | 17.5 | 0.075 | 55 | 2.390 | 2.34 |
| B | 3 | 126 | 5 | 0.110 | 105.5 | 0.521 | 0.48 |
|   | 3a | 128 | 5 | 0.112 | 100.3 | 0.553 | 0.46 |
|   | 4 | 125 | 5 | 0.115 | 104.1 | 0.552 | 0.78 |
|   | 5 | 128 | 5 | 0.112 | 102.6 | 0.546 | 0.88 |
| C | 6 | 130 | 5 | 0.115 | 100.3 | 0.573 | 0.34 |
|   | 7 | 133 | 10 | 0.119 | 103.0 | 1.155 | 0.10 |
|   | 7a | 131 | 10 | 0.119 | 93.3 | 1.28 | 0.32 |
|   | 8 | 132 | 10 | 0.144 | 106.4 | 1.353 | 0.32 |
|   | 9 | 135 | 10 | 0.140 | 106.4 | 1.316 | 0.50 |
| D | 10 | 142 | 5 | 0.112 | 100.3 | 0.558 | 0.54 |
|   | 11 | 145 | 5 | 0.115 | 102.2 | 0.563 | 0.92 |
|   | C-2 | 143 | 5 | 0.122 | 111.4 | 0.53 | 1.16 |
|   | 12 | 145 | 10 | 0.115 | 104.3 | 1.103 | 1.1 |
|   | C-3 | 143 | 10 | 0.140 | 115.8 | 1.209 | 2.0 |
|   | C-4 | 144 | 10 | 0.140 | 113.5 | 1.234 | 2.34 |
|   | C-5 | 139 | 25 | 0.159 | 222.6 | 1.79 | 9.98 |
| E | C-5a | 155 | 3 | 0.119 | 105.9 | 0.34 | 4.82 |
|   | C-5b | 163 | 3 | 0.119 | 104.7 | 0.34 | 2.56 |
|   | C-6 | 159 | 10 | 0.119 | 106.9 | 1.113 | 3.7 |
|   | C-7 | 158 | 25 | 0.152 | 222.6 | 1.71 | 7.5 |
|   | C-8 | 160 | 25 | 0.152 | 222.6 | 1.71 | 10.1 |

| Example | Extruder Type | RPM | Feed Solids % | Soln. Visc. mPa·s | Cat. Conc % BOL[1] | tex[2] °C. | PVAc Soln. Rate g/min |
|---|---|---|---|---|---|---|---|
| 1 | ZSK53 | 130 | 45.4 | 11 | 0.57 | 38 | 1418 |
| 1a | ZSK53 | 120 | 35.5 | 42 | 0.686 | 38 | 1370 |
| 2 | ZSK53 | 120 | 46 | 11 | 0.67 | 47 | 1415 |
| C-1 | ZSK90 | 150 | 45 | 22 | 0.76 | 25 | 5750 |
| 3 | ZSK53 | 140 | 46.7 | 22 | 0.658 | 39 | 1330 |
| 3a | ZSK53 | 140 | 46.6 | 22 | 0.677 | 40 | 1332 |
| 4 | ZSK53 | 131 | 46.6 | 22 | 0.670 | 41 | 1347 |
| 5 | ZSK53 | 150 | 46.6 | 22 | 0.653 | 40 | 1368 |
| 6 | ZSK53 | 131 | 46.6 | 22 | 0.659 | 41 | 1337 |
| 7 | ZSK53 | 130 | 45 | 22 | 0.657 | 42 | 1434 |
| 7a | ZSK53 | 130 | 40.4 | 42 | 0.667 | 42 | 1296 |
| 8 | ZSK53 | 130 | 44.8 | 22 | 0.634 | 49 | 1484 |
| 9 | ZSK53 | 130 | 44.8 | 22 | 0.634 | 48 | 1484 |
| 10 | ZSK53 | 136 | 46.7 | 22 | 0.656 | 40 | 1368 |
| 11 | ZSK53 | 140 | 45 | 22 | 0.630 | 41 | 1370 |
| C-2 | ZSK53 | 141 | 46 | 11 | 0.617 | 43 | 1469 |
| 12 | ZSK53 | 130 | 44.7 | 22 | 0.648 | 41 | 1453 |
| C-3 | ZSK53 | 130 | 46.1 | 11 | 0.564 | 48 | 1672 |
| C-4 | ZSK53 | 130 | 46.1 | 11 | 0.593 | 48 | 1589 |
| C-5 | ZSK57 | 130 | 45 | 22 | 0.47 | 53 | 2740 |
| C-5a | ZSK53 | 140 | 36.7 | 42 | 0.746 | 42 | 1269 |
| C-5b | ZSK53 | 140 | 36.7 | 42 | 0.706 | 42 | 1269 |
| C-6 | ZSK53 | 130 | 44.7 | 22 | 0.632 | 42 | 1491 |
| C-7 | ZSK57 | 130 | 45 | 22 | 0.45 | 51 | 2740 |
| C-8 | ZSK57 | 130 | 45 | 22 | 0.43 | 51 | 2740 |

| Example | Residence Time, min | Premixer Koch Section Dia. | Premixer Koch Section No. | Ross Section Dia. | Ross Section No. |
|---|---|---|---|---|---|

TABLE 1-continued

| ple | PM[3] | Ext.[4] | mm | elements | Type | mm | Elements |
|---|---|---|---|---|---|---|---|
| 1 | 0.22 | 1.1 | 38.1 | 1 | CY[5] | 50.8 | 18 |
| 1a | 0.239 | 1.23 | 25.4 | 1 | CY | 50.8 | 20 |
| 2 | 0.25 | 1.19 | 38.1 | 1 | CY | 50.8 | 20 |
| C-1 | 0.345 | 1.6 | 38.1 | 10[1] | [6] | 101.6 | 14 |
| 3 | 0.232 | 1.12 | 25.4 | 5 | CY | 50.8 | 20 |
| 3a | 0.265 | 1.18 | 25.4 | 5 | CY | 50.8 | 20 |
| 4 | 0.255 | 1.13 | 25.4 | 5 | CY | 50.8 | 20 |
| 5 | 0.259 | 1.15 | 25.4 | 5 | CY | 50.8 | 20 |
| 6 | 0.265 | 1.18 | 25.4 | 5 | CY | 50.8 | 20 |
| 7 | 0.228 | 1.17 | 25.4 | 2 | CY | 50.8 | 20 |
| 7a | 0.32 | 1.29 | 38.1 | 2 | CY | 50.8 | 20 |
| 8 | 0.239 | 1.14 | 38.1 | 1 | CY | 50.8 | 20 |
| 9 | 0.239 | 1.14 | 38.1 | 1 | CY | 50.8 | 20 |
| 10 | 0.265 | 1.18 | 25.4 | 5 | CY | 50.8 | 20 |
| 11 | 0.26 | 1.15 | 25.4 | 5 | CY | 50.8 | 20 |
| C-2 | 0.242 | 1.07 | 25.4 | 5 | CY | 50.8 | 20 |
| 12 | 0.225 | 1.16 | 25.4 | 2 | CY | 50.8 | 20 |
| C-3 | 0.165 | 1.01 | 25.4 | 4 | CY | 50.8 | 14 |
| C-4 | 0.173 | 1.07 | 25.4 | 4 | CY | 50.8 | 14 |
| C-5 | 0.078 | 1.16 | — | None | — | 50.8 | 14 |
| C-5a | 0.25 | 1.11 | 25.4 | 5 | CY | 50.8 | 20 |
| C-5b | 0.255 | 1.13 | 25.4 | 5 | CY | 50.8 | 20 |
| C-6 | 0.22 | 1.13 | 25.4 | 2 | CY | 50.8 | 20 |
| C-7 | 0.078 | 1.16 | — | None | — | 50.8 | 14 |
| C-8 | 0.078 | 1.16 | — | None | — | 50.8 | 14 |

[1]BOL: based on liquid
[2]temperature of the feed stream exiting the premixer
[3]premixer
[4]extruder
[5]in the CY elements the corrugated metal sheets are 28-gauge, and the corrugation height is 0.13 inch.
[6]"Kenics" Static Mixer Obviously, a fourth requirement for low HWI is:
(4) The degree of mixing in the catalyst premixer be equivalent to formation of not less than the number of layers $$L = 2(4)^{14} = 5.37 \times 10^8$$

and preferably equal to the number of layers $$L = 2(4)^{20} = 2.2 \times 10^{12}$$

Additional examples, specifically illustrating the effect of feed temperature are given below.

EXAMPLE 13

Polyvinyl acetate was obtained as a 44.8% solution in methanol. The molecular weight was such that the fully alcoholyzed polymer would yield a 4% solution viscosity of about 30 mPa.s. This polymer solution was fed from pressurized steel drums to a gear pump, which metered it to subsequent process steps. From the gear pump the solution passed through the following equipment, in order:

(1) A heat exchanger, wherein the solution was heated to about 46° C. with hot water at 69° C.

(2) A 1.5-inch diameter "Kenics" static mixer with eight mixing elements and a free volume of 400 ml. This mixer served to thermally homogenize the solution prior to contact with catalyst solution.

(3) A premixer consisting of the following sequential arrangement of static mixing elements:
  (a) one 1 inch Type CY "Koch" SMV elements:
  (b) one 1 inch Type DY "Koch" SMV element;
  (c) two 1 inch Type CY "Koch" SMV elements;
  (d) 14 2 inch "Ross" ISG elements;

(4) A three-way plug-type diverter valve.

(5) A 53-mm diameter ZSK-53 "Werner and Pfleiderer" mixer-extruder (extruder-reactor), with a screw length of 2133 mm and a free volume of approximately 2000 ml. This was operated at 130 rpm.

Catalyst solution (10% sodium methylate in methanol) was injected at the inlet of the premixer at a rate of 113 ml/min. The polymer solution was fed at a rate of 1418 g/min so that the concentration of catalyst relative to polymer solution was 0.664%. Residence times were 0.193 min in the premixer, and 1.19 min in the extruder-reactor.

Four of the five barrel sections of the extruder-reactor were heated with hot water to temperatures of (in order) 55°, 55°, 61°, and 60° C. The last barrel section was cooled with tap water to 36° C. in order to avoid excessive evaporation of solvent from the extruding product.

The reacted product issued from the machine through a short section of 1.5-inch pipe as a wet, crumbly mass. This fell into an 8-liter agitated tank, where it was suspended in a stream of acidified solvent (1.6 liter acetic acid/190 liter solvent; approximate solvent composition: 78% methyl acetate, 20% methanol, 2% water). This "quench" solution was fed at about 2 liter/min.

The resulting slurry was filtered; the filter cake was washed with methanol, and dried in a vacuum oven at 65° C. The dried product was a white, friable granulate, with a Sap. No. of 123. The fraction insoluble in water at 80° C. was 0.18%, and the cold water insoluble fraction was too small to measure. The value of $kC_i(10^2)/\dot{\gamma}_p$ was 0.971.

EXAMPLE 14

Following the experiment described in Example 13, the run was continued with these changes:
(a) The feed temperature was raised to about 58° C., and
(b) The rate was increased to 1554 g/min while catalyst flow was unchanged. This reduced the catalyst concentration to 0.606%; this was done to maintain the same conversion as in Example 13.

Under these conditions the product had a Sap. No. of 124, the hot water insoluble fraction was 0.66%. Thus at constant conversion, the high feed temperature resulted in a significant increase in the hot water insoluble fraction. The value of $kC_i(10^2)\dot{\gamma}_p$ was 1.378.

COMPARATIVE EXAMPLE 9

Polyvinyl acetate was obtained as a 46% solution in methanol. The molecular weight was such that the fully alcoholyzed polymer would yield a 4% solution viscosity of 13 mPa.s. The equipment and procedure were generally the same as described in Example 2, except that the premixer consisted of a serial arrangement of one 1.5 inch "Koch" Type CY element, plus 20 2 inch "Ross" ISG elements.

The polymer solution was heated to 58° C., and fed at a rate of 1484 g/min. A 15% solution of sodium methylate was injected at the premixer inlet at a rate of 74 cc/min to give a catalyst concentration of 0.664% relative to polymer solution. Extruder barrel section temperatures were 54°, 54°, 55°, 55° and 30° C. Residence times were 0.244 min. in the premixer, and 1.16 min. in the extruder-reactor.

The reacted product was slurried in acidified solvent, and worked up as described in Example 2. The Sap. No. was 152 and the hot water insoluble fraction was 1.82%. The value of $kC_i(10^2)\dot{\gamma}_p$ was 1.56.

EXAMPLE 15

The experiment of Comparative Example 9 was continued, and the feed temperature was reduced to 44° C. The feed rate was reduced to 1427 g/min to bring the catalyst concentration to 0.691%. Extruder barrel temperatures were 57°, 56°, 61°, 60°, and 29° C.

The product obtained had a Sap. No. of 151, and the hot water insoluble fraction was 0.98%. Thus the harmful effect of higher feed temperature on uniformity of composition was manifested again. (Comparative Example 9 vs Example 15). The value of $kC_i(10^2)\dot{\gamma}_p$ in this experiment was 1.11.

EXAMPLE 16

This example illustrates the use of a power-driven, torpedo-type premixer. The catalyst was split between premixer and extruder, with 60% going to the extruder. While this was feasible at this small scale (28-mm extruder) it would be preferable at larger scales to add more of the catalyst to the premixer. Of course it is most convenient from the process control standpoint to add all the catalyst to the premixer. Preferably at least 80 percent of the catalyst should be going to the premixer.

A copolymer of vinyl acetate with 6% methyl methacrylate was obtained as an approximately 45 percent solution in methanol. The molecular weight was such that the fully alcoholyzed polymer would yield a 4 percent solution viscosity of about 25 mPa.s. This solution fed by gravity from a nitrogen-blanketed drum to a Moyno pump which metered it to subsequent process steps, including the following equipment, in order:

(1) A shell and tube heat exchanger with 0.20 m² of heat transfer surface. In this unit the polymer solution was heated to 60° C. with water at 66° C.
(2) A 1.25 inch diameter, single-screw extruder-mixer, fitted with a mixing torpedo of the type described in U.S. Pat. No. 3,006,029. This torpedo had the following dimensions:

| | |
|---|---|
| Diameter, in | 1.21 |
| Length, in | 12.9 |
| Number of Flights | 8 |
| Flight lead, in | 6.59, R.H. |
| Flight thickness at crown, in | 0.063 |
| Channel depth, in | 0.25 |

An interrupting channel began 2.13 in along the screw. This was cut with a 0.375" diameter "ball nose" cutter to a depth of 0.25 in. The lead was 2.0 inches right hand. The free volume of this unit was 130 ml. It was operated at a screw speed of 600 rpm.

(3) A 28 mm diameter ZSK-28 "Werner and Pfleiderer" mixer-extruder with a length of 733 mm and a free volume of 200 ml. The proportion of kneading blocks in the screw assembly was 44.3% by axial length. The screw was operated at 250 rpm.
(4) From the extruder discharge the pasty, reacted product fell into a 1 liter stirred kettle, to which was also added 120 ml/min of a solvent mixture (about 78 percent methyl acetate, 20 percent methanol, 2 percent water), plus 3.0 ml/min. of a solution of 6 percent acetic acid in methanol.

Catalyst solution (10 percent sodium methylate in methanol) was injected at the inlet of (2) at the rate of 2.6 ml/min, and at the inlet of (3) at the rate of 4.0 ml/min. Polymer solution was fed at a rate of 120 g/min so that the concentration of catalyst relative to polymer solution was 0.181 percent in the premixer, and 0.459 percent in the extruder-reactor. Residence times were 0.91 min in the premixer, and 1.35 min in the extruder.

The premixer was heated to 58° C., and the extruder barrel to 63° C. by circulating hot water.

The neutralized product slurry was filtered; the filter cake was washed with methanol, and dried in a vacuum oven at 65° C. The dried product had a saponification number of 124; a hot water-insoluble fraction of 0.5–0.8 percent (repeat determinations), and a cold water-insoluble portion of 0.69 percent.

I claim:

1. In a continuous process for the partial alcoholysis of polyvinyl acetate homopolymer or copolymer which process comprises (1) rapidly premixing a methanol solution of polyvinyl acetate homopolymer or copolymer with a methanol solution of a basic catalyst in a mixing zone to form a uniform mixture of said solutions, (2) passing said mixture from the mixing zone into a reaction zone, (3) passing said mixture through said reaction zone while maintaining the temperature and residence time in said reaction zone such that the desired degree of alcoholysis is obtained, (4) continuously removing the resultant products of reaction from the reaction zone and (5) rapidly and uniformly neutralizing the basic catalyst in the resultant solid product by treating said product with an acidified liquid which is an inert non-solvent for the solid product, the improvement which comprises producing a partially alcoholyzed polyvinyl alcohol having a saponification number of up to about 145 and a maximum hot water insoluble fraction of about 1.1% by premixing catalyst and polymer solutions in a static mixer combined with using an intermeshing, self wiping, twin-rotor mixer, or mixing extruder to provide the reaction zone, and by adjusting the feed temperature, the shear rate in the premixer, and the catalyst concentration in the catalyst feed solution such that the ratio $$\frac{kC_i(10^2)}{\dot{\gamma}_p}$$

is from about 0.5 to about 1.4
where k is the alcoholysis reaction rate constant in sec$^{-1}$ $C_i$ is the catalyst feed solution concentration in weight %

$\dot{\gamma}_p$ is the shear rate in the premixer in sec$^{-1}$ provided, that when the saponification number of the partially alcoholyzed polyvinyl alcohol approaches the maximum value of about 145 the ratio $$\frac{kC_i(10^2)}{\dot{\gamma}_p}$$

does not exceed about 1.1.

2. The process of claim 1 wherein the polyvinyl acetate homopolymer or copolymer is alcoholyzed from about 87.2 to about 97 mol %; the comonomer in the polyvinyl acetate copolymer is selected from the group consisting of acrylic acid, methacrylic acid, methyl acrylate, methyl methacrylate, mono- and diesters of maleic acid, dimethyl amino ethyl vinyl ether, and α-olefins having from 2 to 18 C atoms; the polyvinyl acetate homo- or copolymer concentration in the methanol solution fed to the reaction zone is from about 35 to about 55 percent by weight; and at least 60 percent by weight of the catalyst is added to the premixer and at most 40 percent by weight of the catalyst is added directly to the reaction zone.

3. The process of claim 2 wherein the catalyst feed solution concentration is from about 4 to about 25 percent by weight; the inlet temperature of the premixer is from about 30° to about 65° C.; the residence time in the premixer is from about 0.04 to about 0.6 minutes; the temperature in the reaction zone is from about 45° to about 75° C.; and the residence time in the reaction zone is from about 0.5 to about 4 minutes.

4. The process of claim 3 wherein the feed temperature, the shear rate in the premixer, and the catalyst concentration in the catalyst feed solution are adjusted such that $$\frac{kC_i(10^2)}{\dot{\gamma}_p}$$

is from about 0.9 to about 1.1.

5. The process of claim 4 wherein the polyvinyl acetate homopolymer or copolymer is alcoholyzed from about 87.2 to about 90 mol %; the comonomer in the polyvinyl acetate copolymer is selected from the group consisting of acrylic acid, methacrylic acid, methyl acrylate, and methyl methacrylate, and at least 80 percent by weight of the catalyst is added to the premixer and at most 20% by weight of the catalyst is added directly to the reaction zone.

6. The process of claim 5 wherein said basic catalyst is selected from the group consisting of sodium methylate, sodium hydroxide, lithium methylate, lithium hydroxide, potassium methylate and potassium hydroxide.

7. The process of claim 6 wherein said basic catalyst is selected from the group consisting of sodium methylate, lithium methylate and potassium methylate.

8. The process of claim 7 wherein the catalyst feed solution concentration is from about 5 to about 15 percent by weight; the water content of the feed to the premixer is not more than about 1000 ppm; the inlet temperature of the premixer is from about 40° to about 60° C.; the residence time in the premixer is from about 0.067 to about 0.43 minutes; the temperature in the reaction zone is from about 50° to about 70° C., and the residence time in the reaction zone is from about 0.85 to about 3 minutes.

9. The process of claim 8 wherein said basic catalyst is sodium methylate and the water content of the feed to the premixer is not more than about 500 ppm.

10. The process of claim 9 wherein the polyvinyl alcohol has a maximum hot water insoluble fraction of about 0.6 percent by weight.

11. The process of claim 10 wherein the polyvinyl acetate homopolymer or copolymer is alcoholyzed to about 88 mol percent; and substantially all of the catalyst is added to the premixer.

12. The process of claim 11 wherein the catalyst feed solution concentration is from about 7 to about 10% by weight; the inlet temperature of the premixer is from about 40° to about 45° C.; the residence time in the premixer is from about 0.1 to about 0.3 min; the temperature in the reaction zone is from about 55° to about 65° C.; and the residence time in the reaction zone is from about 1.0 to about 1.5 minutes.

13. The process of claim 12 wherein the polyvinyl acetate homo- or copolymer concentration in the methanol solution fed to the reaction zone is about 48% by weight.

* * * * *